Figure 1:
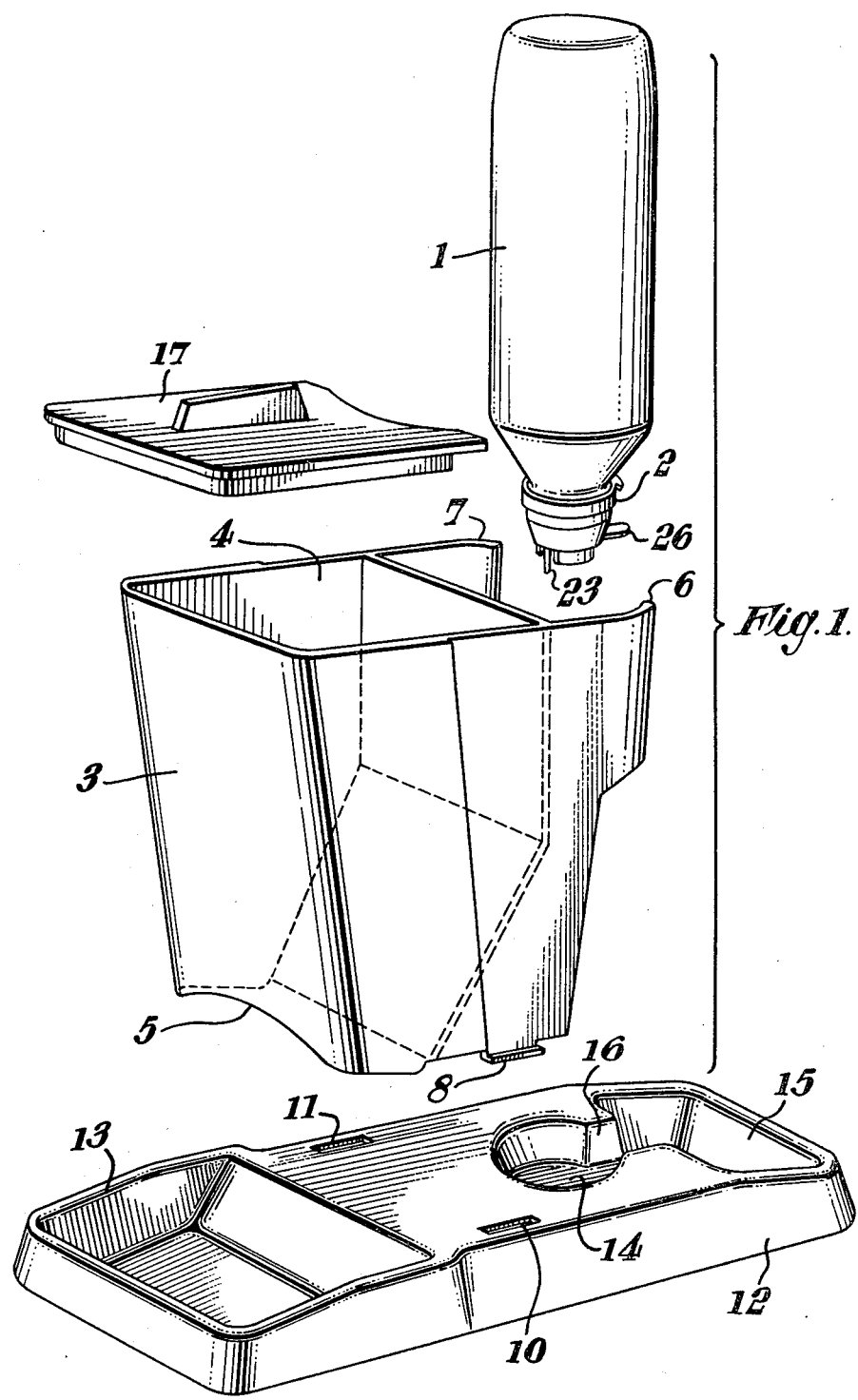

United States Patent [19]

Futers et al.

[11] 4,134,365
[45] Jan. 16, 1979

[54] AUTOMATIC FEEDING APPARATUS

[76] Inventors: Lionel H. Futers, 10 Lenham Rd., East Rottingdean, Brighton, East Sussex; Robert P. Beaumont, 9 Outlook Ave., Peacehaven, East Sussex, both of England

[21] Appl. No.: 750,554

[22] Filed: Dec. 14, 1976

[30] Foreign Application Priority Data

Sep. 2, 1976 [GB] United Kingdom ............... 36297/76

[51] Int. Cl.² .......................... A01K 5/00; A01K 7/00
[52] U.S. Cl. ...................................... 119/51.5; 119/77
[58] Field of Search ........................ 119/51.5, 77, 75

[56] References Cited

U.S. PATENT DOCUMENTS

| 871,377 | 11/1907 | Swagler et al. | 119/77 |
| 1,488,584 | 4/1924 | Bakken | 119/77 |
| 1,895,435 | 1/1933 | Ahrens | 119/51.5 |
| 3,730,141 | 5/1973 | Manning et al. | 119/51.5 |

*Primary Examiner*—Hugh R. Chamblee
*Attorney, Agent, or Firm*—Eyre, Mann, Lucas & Just

[57] ABSTRACT

The invention relates to automatic feeding apparatus for animals and particularly for domestic cats. The apparatus operates to provide a constant supply of food and drink respectively in a food dish and a drinking vessel. The food is automatically supplied to the food dish by means of a hopper and the liquid passes from the liquid container through a special cap into a reservoir which is in communication with the drinking vessel. The liquid container is removably mounted in clips formed integrally with the hopper and the cap includes a pivotally mounted flap arranged so that the flap can be opened when the liquid container is inserted into the clips and the cap is pressed downwardly into the reservoir.

4 Claims, 5 Drawing Figures

U.S. Patent  Jan. 16, 1979  Sheet 1 of 2  4,134,365

AUTOMATIC FEEDING APPARATUS

This invention relates to automatic feeding apparatus for animals and it is an object of the invention to provide apparatus which is particularly useful for feeding domestic cats.

Automatic feeding apparatus is known in which liquid drips through a tap from a container into a drinking vessel located below the tap. However, such apparatus suffers from the disadvantage that, it it is used in domestic premises, the drinking vessel must be made large enough to accommodate all the liquid in the container. Otherwise, if the animal does not remove any of the liquid from the drinking vessel for any reason, the liquid will overflow and may damage the floor covering. The known apparatus is also arranged so that, when all the liquid has dripped out of the container, a further container holding food for the animal is inverted and empties its contents onto the floor. Again, this arrangement is not satisfactory for use with domestic animals since the food may be spread over a wide area and also, if the animal is in the vicinity of the apparatus at the time when the food container is inverted, the animal may be frightened away and be unwilling to return to the vicinity of the apparatus.

It is a particular object of the present invention to provide apparatus which does not suffer from these disadvantages.

Accordingly, apparatus in accordance with the invention includes a liquid container having an opening through which liquid is automatically dispensed into a reservoir in response to removal of liquid from said reservoir.

Preferably, the reservoir is in communication with a drinking vessel and it will be understood that the apparatus functions to maintain constant the level of the liquid in the drinking vessel.

Preferably, the liquid container is provided with a cap having openings to allow liquid to leave the container and air to enter the container, said cap being located in the reservoir and the arrangement being such that, when the liquid in the reservoir rises to a predetermined level, it prevents air entering the container and hence prevents further liquid from leaving the container.

In a preferred embodiment, the cap would be provided with a pivotally-mounted flap movable from a first position in which two openings are formed in the cap, to a second position in which said two openings are closed. The flap may be provided with an operating member projecting therefrom so that the flap may be moved from the second position to the first position by pressing the operating member against the base of the reservoir.

Preferably, apparatus in accordance with the invention includes a food container having an opening through which food is automatically dispensed into a food dish and the liquid container may be removably supported by said food container, which may be in the form of a hopper, the lower end of which is in communication with the food dish.

In a preferred embodiment of the invention, the apparatus includes a first member of synthetic resin material constituting the food container and the clips for supporting the liquid container, and a second member of synthetic resin material constituting the food dish, the reservoir, the drinking vessel and a passage connecting the reservoir to the drinking vessel.

Figure 2:
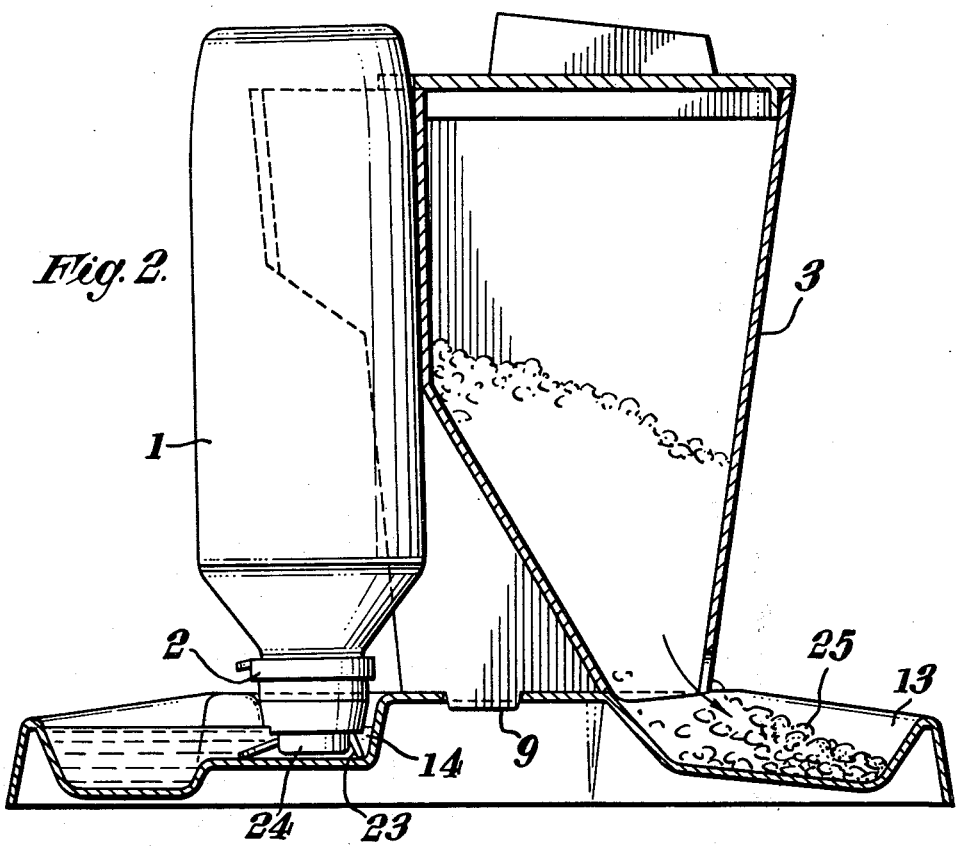
Figure 3:
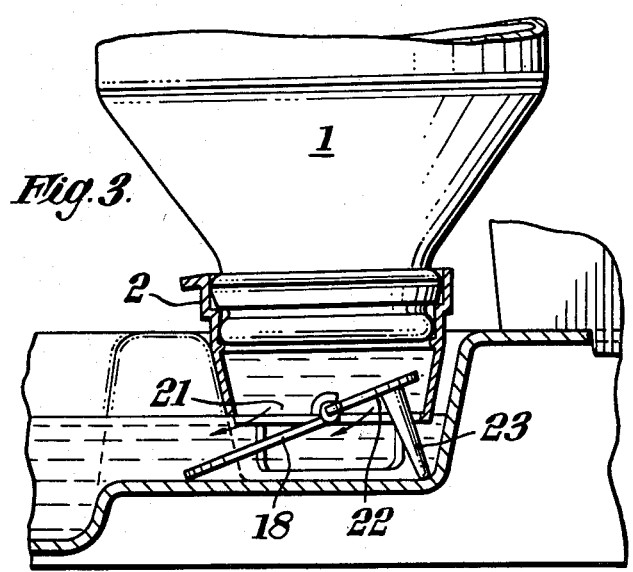
Figure 4:
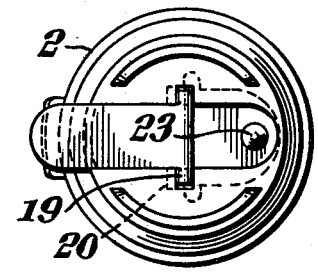

The invention will now be described in further detail with reference to the accompanying diagrammatic drawings in which:

FIG. 1 is an exploded perspective view of feeding apparatus in accordance with the invention, FIG. 2 is a side elevation partly in cross-section of the apparatus illustrated in FIG. 1, FIG. 3 is an enlarged sectional view of a part of the apparatus illustrated in FIGS. 1 and 2, FIG. 4 is a plan view of the removable cap for the liquid container illustrated in FIGS. 1, 2 and 3, and FIG. 5 is a side elevation partly in cross-section of the cap illustrated in FIG. 4.

The apparatus illustrated includes a liquid container 1, provided with a removable cap 2. The apparatus also includes a food container 3, which is shaped to form a hopper, having an upper opening 4 which may be closed by means of a cover 17, and a lower opening 5. The food container 3 is provided with clips 6 and 7 for removably supporting the liquid container 1. The food container is also provided with lugs 8 and 9, designed to fit into slots 10 and 11 in a base member 12. The food container consists of resilient synthetic resin material and can be fitted to the base member 12 by compressing the sides of the container to enable the lugs 8 and 9 to pass respectively through the slots 10 and 11.

The base member 12 includes a food dish 13, a reservoir 14, a drinking vessel 15, and a passage 16 providing communication between the reservoir 14 and the drinking vessel 15.

The liquid container 1 and the cap 2 both consist of synthetic resin material and are arranged so that, when the cap is pushed on to the neck of the liquid container, a water-tight seal is formed between them. A flap 18 is pivotally-mounted in a transverse slot in the cap 2 by means of an integrally-formed spindle 19, co-operating with lugs 20 moulded in the cap. The flap is movable from the position shown in FIG. 3 in which two openings 21 and 22 are formed one at either end of the slot, to a second position illustrated in FIG. 5 in which the two openings are closed. The flap 18 is also provided with an operating member 23 and an extension 25 which may be used for manually moving the flap from the open position to the closed position or vice versa.

Figure 5:
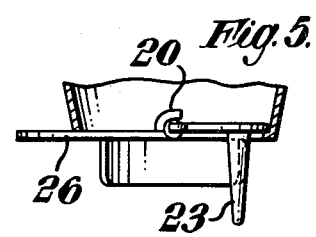

If the container 1 is filled with water, and the can 2 is fitted thereon with the flap 18 in the closed position illustrated in FIG. 5, the container may be inverted without spilling the water. The container can then be pushed between the clips 6 and 7 so that it assumes the position illustrated in FIG. 2. As the container is moved downwardly so that the cap 2 enters the reservoir 14, the operating member 23 contacts the base 24 of the reservoir and, as a result, the flap is rotated about its pivot axis until it assumes the open position illustrated in FIG. 3. Water will then flow out of one of the openings 21 or 22, and air will be able to enter the container through the other opening to replace the water leaving the container. However, when the level of the water rises above the openings 21 and 22, air will no longer be able to enter the container and consequently, the flow of water from the container will cease. It is, of course, to be understood that the water will flow from the reservoir 14, through the passage 16 to the drinking vessel 15 until the levels in the reservoir and the drinking vessel are the same. If water is removed from the drinking vessel 15, for example by being drunk by a cat, water will flow into the drinking vessel from the reservoir 14 and, as soon as the level of the water in the reservoir 14 falls below the level of one of the openings in the cap, air will be able to enter the container 1 and, as a result, water will automatically flow out of the other opening in the cap to restore the levels in the reservoir and the drinking vessel.

Dry food is placed in the food container 3 and will fall towards the bottom of the container under the influence of gravity. Some of this food will move into the food dish 13 as shown at 25 in FIG. 2. This food is accessible to the cat and, when it is removed from the dish, further food will automatically fall down to the hopper to replace the food that has been eaten.

If desired, a further passage (not illustrated) may be provided between the reservoir 14 and the food dish 13, to enable liquid to flow from the reservoir into the food dish. If this arrangement is used, the dispensed food in the dish 13 will automatically be wetted by the liquid in the reservoir.

What is claimed is:

1. Automatic feeding apparatus for animals comprising:
   a liquid container;
   a cap removably fitted to said liquid container, said cap being provided
      with a hole having first and second ends and said hole having a pivotably mounted flap, the pivot axis for said flap being located intermediate said first and second ends of said hole an operating member projecting from said flap operative to move said pivotably mounted flap to a first position in which two openings are formed in the cap, one on each side of said pivot axis, and said pivotably mounted flap also being movable to a second position in which said two openings are closed;
   a first member consisting of synthetic resin material and constituting
      a hopper and clips adapted to support said liquid container; and
   a second member removably secured to said first member, said second
      member consisting of synthetic resin material and constituting a food dish, a reservoir, a drinking vessel and a passage connecting said reservoir to said drinking vessel.

2. An automatic feeding appartus for animals comprising:
   a food container;
   a liquid container;
   a cap removably fitted to said liquid container;
   a feeding vessel;
   a drinking vessel; and
   a reservoir means in communication with said drinking vessel; said food container being in the form of a hopper, the lower end of which is in
      communication with said feeding vessel, and said food container including a pair of resilient clips for removably supporting said liquid container with said cap located in said reservoir means; and
   said cap being provided with a pivotably mounted flap movable from a first position
      in which two openings are formed in the cap to a second position in which said two openings are closed, and said flap comprising an operating member projecting therefrom and adapted to move said flap from said second position to said first position when said operating member is pressed against the base of said reservoir means.

3. Apparatus as claimed in claim 2, including a passage connecting said reservoir means to said feeding vessel.

4. Automatic feeding apparatus for animals, comprising:
   a liquid container;
   a reservoir means;
   means for supporting the said liquid container relative to the said reservoir means;
   a cap fitted to said liquid container and located in said reservoir means, said cap being
      provided with a pivotably mounted flap movable from a first position in which two openings are formed in the cap, to a second position in which said two openings are closed;
   wherein said flap further comprises an operating member projecting therefrom and adapted
      to move said flap from said second position to said first position when said operating member is pressed against the base of said reservoir means;
   wherein said cap comprises a substantially cylindrical wall, open at one end, and
      provided with a flat wall at the other end perpendicular to the axis of the cylinder, said flat wall being provided with a slot extending at least to the cylindrical wall at one end and to within a short distance of the wall at the other end;
   wherein said flap is pivotably mounted within the confines of the said slot; and wherein the end of the flap adjacent to said one end of the slot extends beyond the
      cylindrical wall to provide means for manually moving the flap from the first position to the second position and vice-versa.

* * * * *